Sept. 1, 1925.
A. CSERÉP
1,551,978
BIFOCAL SPECTACLES AND EYEGLASSES
Filed May 8, 1924
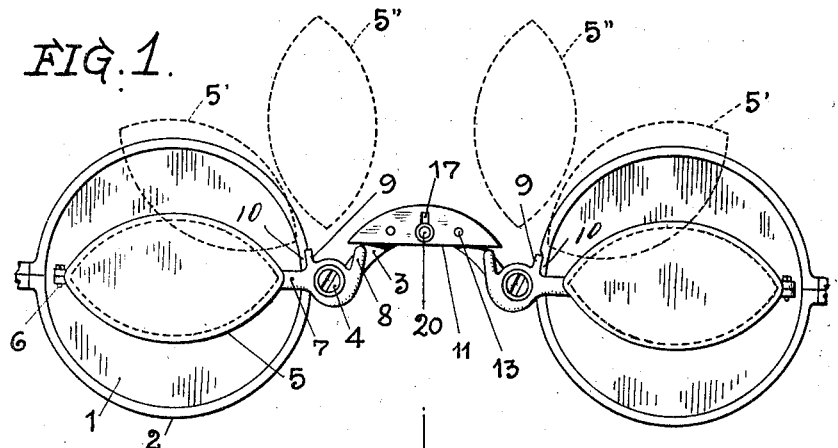
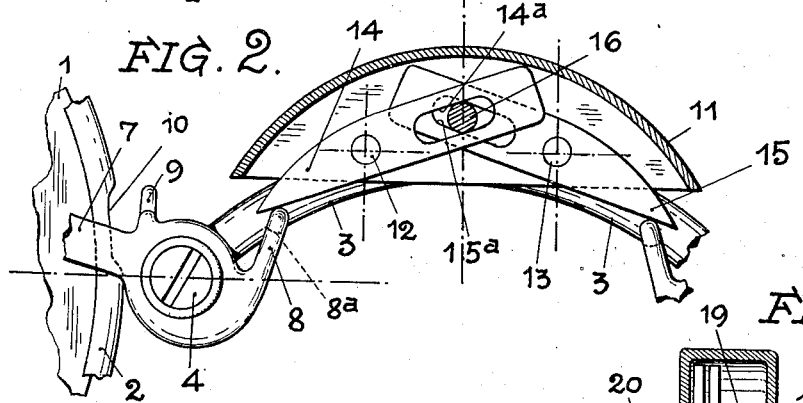
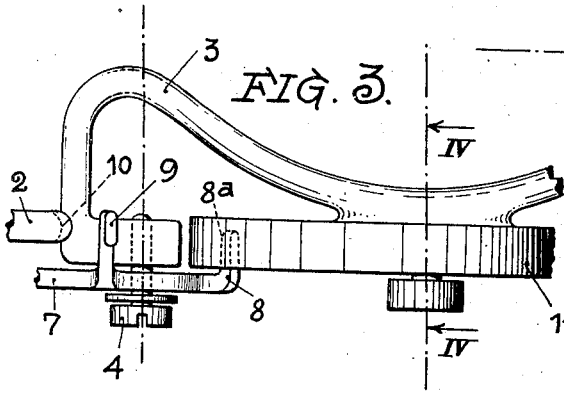
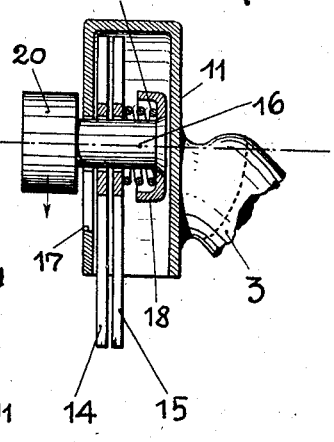
Inventor
A. Cserép
By Marks & Clerk Patented Sept. 1, 1925.

1,551,978

UNITED STATES PATENT OFFICE.

ALEXANDER CSERÉP, OF DEBRECEN, HUNGARY.

BIFOCAL SPECTACLES AND EYEGLASSES.

Application filed May 8, 1924. Serial No. 711,914.

*To all whom it may concern:*

Be it known that I, ALEXANDER CSERÉP, a citizen of Hungary, and residing at 4 Dugonicz Titusz-u., Debrecen, Hungary, have invented certain new and useful Improvements in and Relating to Bifocal Spectacles and Eyeglasses, of which the following is a specification.

This invention relates to bifocal spectacles and eye-glasses for short-sighted and long-sighted persons, which are adapted to be used both for viewing near and distant objects. Bifocal glasses have already been proposed, in which supplementary lenses are pivotally mounted on the frame of the main lens in a plane, which is parallel to that of the main glass. Spectacles of this type, as hitherto made, have many disadvantages. Thus, for instance, it is inconvenient to change the position of the supplementary lens each time the spectacles are used either for distant or near vision, as it requires the use of both hands and has the further disadvantage, that the supplementary lenses, when swung out of the operative position, are thrown over to the outside and thus draw attention and are unsightly. Another reason against the use of such bifocal glasses is, that the weight resting on the nose was too great. Other constructional forms of bifocal glasses even necessitated the glasses being entirely taken off, for putting the supplementary lenses into and out of operation, while in other cases there was a danger of the eye-lashes of the person using the glasses being caught between the supplementary lenses and the main lenses.

In the glasses forming the subject of the present invention a controlling mechanism is provided consisting of two-armed levers mounted in a cover and pivoted about pins, the said levers being connected in a positive manner by means of a pin, which projects through longitudinal slots and is guided in a slot in the cover. A spring is provided for holding the controlling mechanism in the positions in which it is set.

In the accompanying drawing a constructional form of spectacles according to the invention is shown by way of example, Fig. 1 being a front view of the spectacles.

Fig. 2 a part of the mechanism for controlling the movement of the supplementary lenses as seen from the front and partly in section to an enlarged scale, Fig. 3 a top view of Fig. 2 and Fig. 4 a vertical section on line IV—IV of Fig. 3 to an enlarged scale.

In Figure 1 1 is the glass lens of the spectacles, which is of the ordinary type, 2 is the metal rim or the frame surrounding the lenses, 3 the bridge for the nose, 4 the pin on which the supplementary lens 5 is pivoted in front of the lens 1 and 6 the frame surrounding the lens 5 in a circumferential groove of the same. The lever, which is pivotally mounted on the pin 4, has two arms, an arm 7, which is fixed to or forms a continuation of the frame 6, and an arm 8. 9 is a stop member, which limits the movement of the two-armed lever 7, 8 in one direction and fits into a recess 10 in the frame 2 (Fig. 1). The stop member 9 supports the supplementary lens 5 in its operative position in which it rests under the action of gravity.

To the front of the bridge 3 is soldered the segment-shaped cover 11, which is open at the bottom and the periphery of which follows that of the bridge 3. On pins 12, 13 in the front wall of the cover 11 are pivotally mounted the sectors (blades) 14, 15, which have the form of two-armed levers. A pin 16 extends through the longitudinal slots $14^a$, $15^a$ of the sectors 14 and 15 and is adapted to slide in the vertical slot 17 in the front wall of the cover 11. The dished washer 18 containing the helical spring 19 is fixed to the rear end of the pin 16. The helical spring 19 presses the sectors 14 and 15 against one another and against the inside of the wall of the cover 11 and the knob 20 of the pin 16 against the outside of the wall of the said cover, increases the friction between these parts and automatically keeps the pin 16 with its knob 20 in its top and bottom positions. The pin 16 provides a positive connection between the sectors, so that the latter are compelled to move simultaneously and to perform perfectly symmetrical rotary motions.

On the knob 20 being pushed into its top position, shown in Fig. 2, the smaller ends of the sectors 14 and 15 will act on the parts $8^a$ of the arms 8 of the two-armed levers 7, 8, which parts extend under the cover 11 and will turn or raise the supplementary lenses 5 in opposition to the action of gravity into the position 5′, shown in dotted lines. On the knob 20 being pushed down, the supplementary lenses 5 will return under the action of gravity into the operative position shown in Fig. 1.

If the spectacles be inverted, so that the open part of the cover 11 comes to the top, the supplementary lenses 5 will swing into the position 5" under the action of gravity and can be readily cleaned in this position.

The supplementary lens 5 is preferably given a lenticular or oval form corresponding to the shape of the open eye, so that, when lowered into the operative position, shown in Fig. 1, the frame 6 does not interfere with the vision and is barely perceptible. The lenticular shape has the advantage that the eye can make lateral movements during reading or writing, without it being necessary to move the head at all. The supplementary lens 5 provides the most ideal optical conditions, as the focal point lies in the optical axis of the eye. The diopter number of the lens 5 is so chosen as to supplement the lens 1 for near or distant vision or to convert it to an ordinary glass having two plano-parallel surfaces. The invention is not limited to the controlling means for the supplementary lenses 5, shown in the drawing, and to the particular form described above. The supplementary lenses may be so arranged as to be capable of being raised and lowered parallel to each other. The shape of the supplementary lenses need not be lenticular, but may be circular or elliptical.

Without in any way departing from the spirit of the invention the pivotally mounted supplementary lenses may be used, not only with spectacles, but with eye-glasses as well. It is also possible to convert existing spectacles or eyeglasses into bifocal glasses, without any technical difficulty.

What I claim is:—

1. Bifocal spectacles and eye-glasses comprising in combination a frame, a bridge forming part of the frame, two main lenses mounted in the said frame, two supplementary lenses each pivoted to the said frame so as to be capable of being raised and lowered in front of the said main lenses in a plane parallel to the latter, means for raising and lowering the supplementary lenses, which means are constituted by a cover member, two two-armed levers pivoted to the said member and within the same, a longitudinal slot in one arm of each of the said levers, a vertical slot in one side of the cover member and a pin extending through the said longitudinal slots and vertical slot, as set forth.

2. Bifocal spectacles and eye-glasses comprising in combination a frame, a bridge forming part of the frame, two main lenses mounted in the said frame, two supplementary lenses each pivoted to the said frame, so as to be capable of being raised and lowered in front of the said main lenses in a plane parallel to the latter, means for raising and lowering the supplementary lenses, which means are constituted by a cover member, two two-armed levers pivoted to the said member and within the same, a longitudinal slot in one arm of each of the said levers, a vertical slot in one side of the said cover member, a pin extending through the said longitudinal slots and vertical slot and a spring for fixing the means for raising and lowering the supplementary lenses, when the latter are in the raised position, as set forth.

3. Bifocal spectacles and eye-glasses comprising in combination a frame, a bridge forming part of the frame, two main lenses mounted in the said frame, two supplementary lenses, a member for supporting each supplementary lens, the said supporting members being pivoted to the frame, so that the supplmentary lenses are capable of being raised and lowered in front of the said main lenses in a plane parallel to the latter, a projecting part on each pivoted supporting member, means for raising and lowering the supplementary lenses, which means are constituted by a cover member, two two-armed levers pivoted to the said member and within the same, a longitudinal slot in one arm of each of the said levers, a vertical slot in one side of the cover member and a pin extending through the said longitudinal slots and vertical slot, the projecting part of each of the pivoted members supporting the supplementary lenses lying in the path of the unslotted arm of one of the two-armed pivoted levers, as set forth.

4. Bifocal spectacles and eye-glasses comprising in combination a frame, a bridge forming part of the frame, two main lenses mounted in the said frame, two supplementary lenses, a member for supporting each supplementary lens, the said supporting members being pivoted to the frame, so that the supplementary lenses are capable of being raised and lowered in front of the said main lenses in a plane parallel to the latter, a projecting part on each pivoted supporting member, means for raising and lowering the supplementary lenses, which means are constituted by a cover member, two two-armed levers pivoted to the said member and within the same, a longitudinal slot in one arm of each of the said levers, a vertical slot in one side of the cover member, a pin extending through the said longitudinal slots and vertical slot and a stop member on each of the side pivoted supporting members for the supplementary lenses, capable of supporting the supplementary lenses in their lowered position, the projecting part of each of the pivoted members, which support the supplementary lenses, lying in the path of the unslotted arm of one of the two-armed pivoted levers, as set forth.

5. Bifocal spectacles and eye-glasses comprising in combination a frame, a bridge forming part of the frame, two main lenses mounted in the said frame, two supplementary lenses, a member for supporting each supplementary lens, the said supporting members being pivoted to the frame, so that the supplementary lenses are capable of being raised and lowered in front of the said main lenses in a plane parallel to the latter, a projecting part on each pivoted supporting member, means for raising and lowering the supplementary lenses, which means are constituted by a cover member, two two-armed levers pivoted to the said member and within the same, a longitudinal slot in one arm of each of the said levers, a vertical slot in one side of the cover member, a pin extending through the said longitudinal slots and vertical slot, a stop member on each of the said pivoted supporting members for the supplementary lenses, capable of supporting the supplementary lenses in their lowered position, the projecting part of each of the pivoted members, which support the supplementary lenses, lying in the path of the unslotted arm of one of the two-armed pivoted levers and a recess in the frame capable of coacting with the said stop member, as set forth.

6. Bifocal spectacles and eye-glasses comprising in combination a frame, a bridge forming part of the frame, two main lenses mounted in the said frame, two supplementary lenses each pivoted to the said frame so as to be capable of being raised and lowered in front of the said main lenses in a plane parallel to the latter, a frame round each supplementary lens sunk in a groove in the periphery of the lens, means for raising and lowering the supplementary lenses, which means are constituted by a cover member, two two-armed levers pivoted to the said member and within the same, a longitudinal slot in one arm of each of the said levers, a vertical slot in one side of the cover member and a pin extending through the said longitudinal slots and vertical slot, as set forth.

7. Bifocal spectacles and eye-glasses comprising in combination a frame, a bridge forming part of the frame, two main lenses mounted in the said frame, two lenticular supplementary lenses each pivoted to the said frame so as to be capable of being raised and lowered in front of the said main lenses in a plane parallel to the latter, means for raising and lowerng the supplementary lenses, which means are constituted by a cover member, two two-armed levers pivoted to the said member and within the same, a longitudinal slot in one arm of each of the said levers, a vertical slot in one side of the cover member and a pin extending through the said longitudinal slots and vertical slot as set forth.

In testimony whereof I have signed my name to this specification.

ALEXANDER CSERÉP.